(12) United States Patent
Vancoille

(10) Patent No.: US 7,850,374 B2
(45) Date of Patent: Dec. 14, 2010

(54) OPTICAL TRANSMITTER MODULE WITH AN INTEGRATED LENS AND METHOD FOR MAKING THE MODULE

(75) Inventor: Eric Vancoille, Singapore (SG)

(73) Assignee: Avago Technologies Fiber IP (Singapore) Pte. Ltd., Singapore City (SG)

( * ) Notice: Subject to any disclaimer, the term of this patent is extended or adjusted under 35 U.S.C. 154(b) by 1051 days.

(21) Appl. No.: 11/035,770

(22) Filed: Jan. 14, 2005

(65) Prior Publication Data

US 2006/0159404 A1 Jul. 20, 2006

(51) Int. Cl.
*G02B 6/12* (2006.01)
*G02B 6/36* (2006.01)

(52) U.S. Cl. .......................................... 385/93; 385/14
(58) Field of Classification Search ................... 385/14, 385/49, 88, 92, 93
See application file for complete search history.

(56) References Cited

U.S. PATENT DOCUMENTS

| | | | |
|---|---|---|---|
| 5,557,116 A * | 9/1996 | Masui et al. | 257/100 |
| 5,708,743 A * | 1/1998 | DeAndrea et al. | 385/88 |
| 5,937,114 A | 8/1999 | Fisher et al. | |
| 5,993,075 A * | 11/1999 | Huang et al. | 385/92 |
| 6,203,212 B1 | 3/2001 | Rosenberg et al. | |
| 6,841,096 B2 * | 1/2005 | Quake et al. | 264/2.5 |
| 2003/0007749 A1 * | 1/2003 | Hurt et al. | 385/88 |

FOREIGN PATENT DOCUMENTS

| | | |
|---|---|---|
| EP | 0 786 838 A2 | 7/1997 |
| GB | 2 330 425 A | 4/1999 |
| GB | 2 360 656 A | 9/2001 |

* cited by examiner

*Primary Examiner*—Mark A Robinson
*Assistant Examiner*—Erin D Chiem

(57) ABSTRACT

An optical transmitter module and method for making the module utilizes a housing structure having an integrated lens. The housing structure includes an output opening, which has a central axis along a first direction, to receive an optical fiber. The optical transmitter module further comprises conductive pins that are attached to the housing structure such that the conductive pins extend from the housing structure in a second direction, which is substantially perpendicular to the first direction. The optical transmitter module further comprises a light source mounted on one of the conductive pins such that light from the light source is emitted along the first direction toward the integrated lens of the housing structure to transmit the light into the optical fiber.

8 Claims, 7 Drawing Sheets

OPTICAL TRANSMITTER MODULE WITH AN INTEGRATED LENS AND METHOD FOR MAKING THE MODULE

BACKGROUND OF THE INVENTION

Laser dies are commonly used in optical communication systems to transmit optical signals through optical fibers. Each laser die is typically packaged as an optical transmitter module, which can be mounted on a printed circuit board (PCB) and coupled to an optical fiber of an optical transceiver. Thus, an optical transmitter module must be designed to be electrically and physically attached to a PCB, and to be connected to an optical transceiver.

A conventional optical transmitter module comprises a header with a metal post on which an edge-emitting laser die is mounted. The header includes lead pins, which are mutually electrically isolated. Two of the lead pins are electrically connected to the laser die to provide driving currents to the laser die. The lead pins are used to couple the optical transmitter module to a PCB so that the optical transmitter module can be electrically and physically attached to the PCB. The optical transmitter module also comprises a metal housing assembly that is coupled to the header. The metal housing assembly includes a fiber ferrule with an opening to receive an optical fiber. The metal housing assembly is designed to secure a lens in the form of a ball lens or a glass a-sphere at a position between the header and the fiber ferrule opening so that optical signals from the laser die are efficiently focused onto the optical fiber inserted into the fiber ferrule opening.

A concern with the conventional optical transmitter module is that the edge-emitting laser die is mounted at ninety degrees on the metal post of the header, which complicates the wire bonding of the laser die. Furthermore, the metal post must function as a heat sink since the configuration of the optical transmitter module with respect to the lens requires the use of high driving currents for the laser die.

Another concern with the conventional optical transmitter module is that the ball lens or glass a-sphere is costly and needs special mounting provisions in order to ascertain the fiber receives the transmitted light in an efficient way.

Still another concern with the conventional optical transmitter module is that the header lead pins need to be bent in complex ways to attach the module to a PCB and to connect to an optical transceiver, which can compromise signal and structural integrity.

In view of these concerns, there is a need for an optical transmitter module that does not require a header with a metal post, a lens in the form of a ball lens or a glass a-sphere and header lead pins that must be bent in complex ways to attach the module to a PCB and to connect the module to an optical transceiver.

SUMMARY OF THE INVENTION

An optical transmitter module and method for making the module utilizes a housing structure having an integrated lens to optically couple light emitted from a light source efficiently to an optical fiber connected to the housing structure. The integrated lens allows the use of polymer materials to form the housing structure, which reduces manufacturing costs. The optical transmitter module is configured such that conductive pins extend from the housing structure along a direction that is substantially perpendicular to a direction along which light from the light source is emitted and to which the central axis of an output opening of the housing structure is positioned. The output opening is used to connect the optical fiber to the housing structure. The configuration of the optical transmitter module allows the module to be attached to a printed circuit board (PCB) without having to bend the conductive pins in complex ways.

An optical transmitter module in accordance with an embodiment of the invention comprises a housing structure, a plurality of conductive pins and a light source. The housing structure has an integrated lens. The housing structure includes an output opening to receive an optical fiber. The output opening has a central axis along a first direction. The conductive pins are attached to the housing structure. The conductive pins are configured to extend from the housing structure along a second direction, which is substantially perpendicular to the first direction. The light source is mounted on a specific conductive pin of the conductive pins such that light from the light source is emitted along the first direction toward the integrated lens of the housing structure to transmit the light into the optical fiber.

A method for making an optical transmitter module in accordance with an embodiment of the invention comprises providing a housing structure having an integrated lens, a plurality of conductive pins and a light source, the housing structure including an output opening having a central axis along a first direction, mounting the light source on a particular conductive pin of the conductive pins, and attaching the conductive pins to the housing structure such that the conductive pins extend from the housing structure along a second direction and light from the light source is emitted along the first direction. The second direction is substantially perpendicular to the first direction.

Other aspects and advantages of the present invention will become apparent from the following detailed description, taken in conjunction with the accompanying drawings, illustrated by way of example of the principles of the invention.

DETAILED DESCRIPTION

Figure 1:
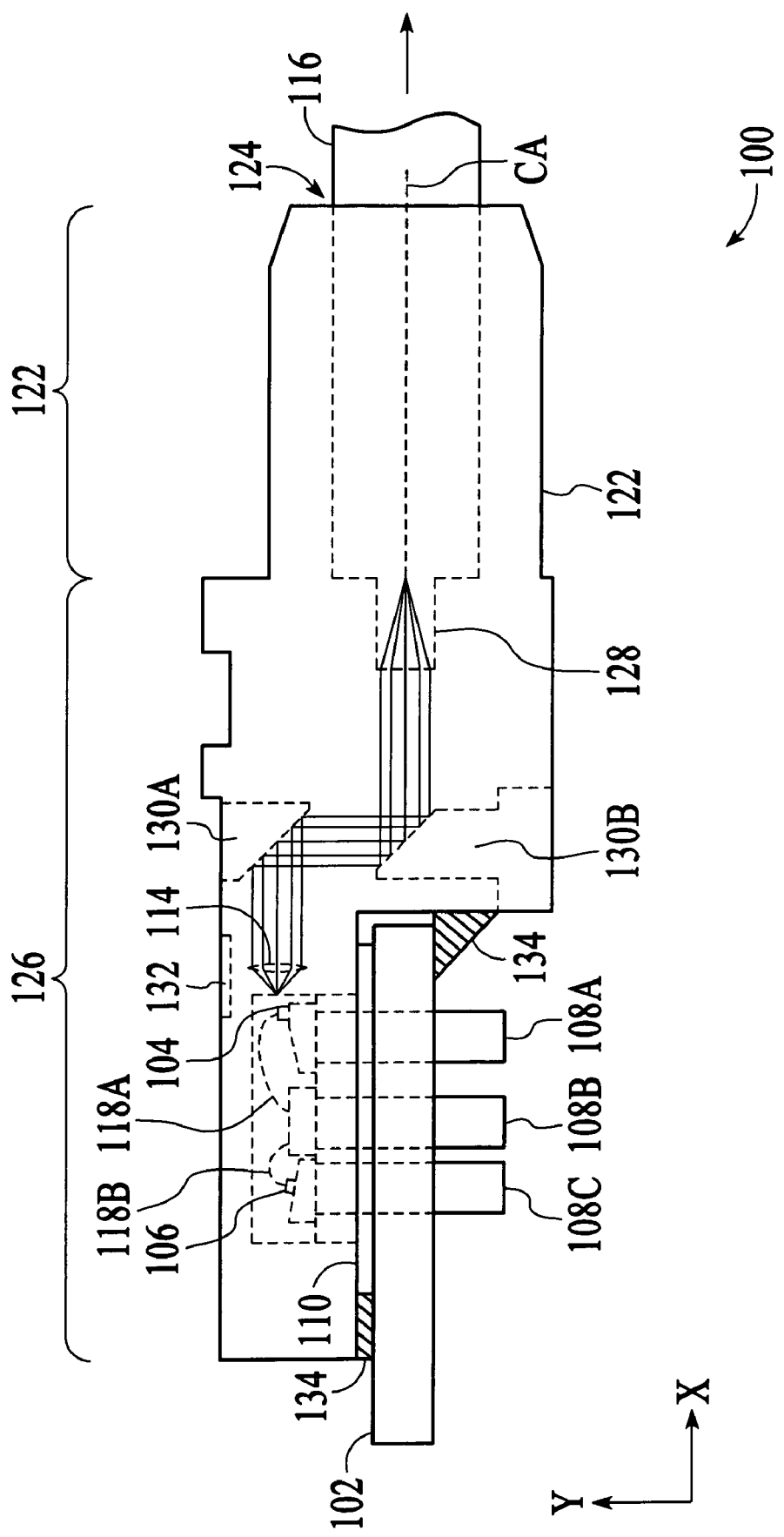
FIG. 1 is a side view of an optical transmitter module in accordance with an embodiment of the invention.
Figure 2:
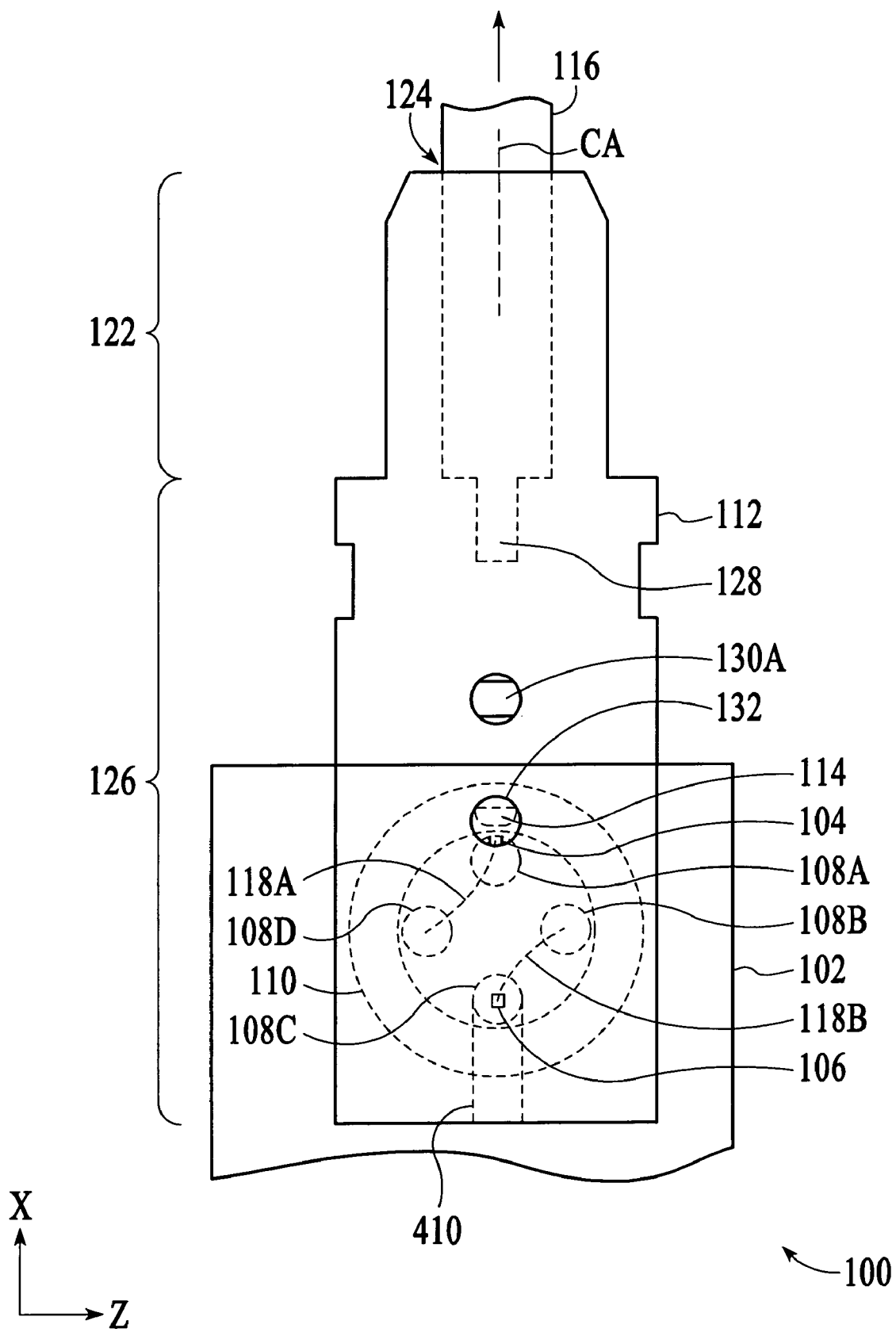
FIG. 2 is a top view of the optical transmitter module of FIG. 1.
Figure 3:
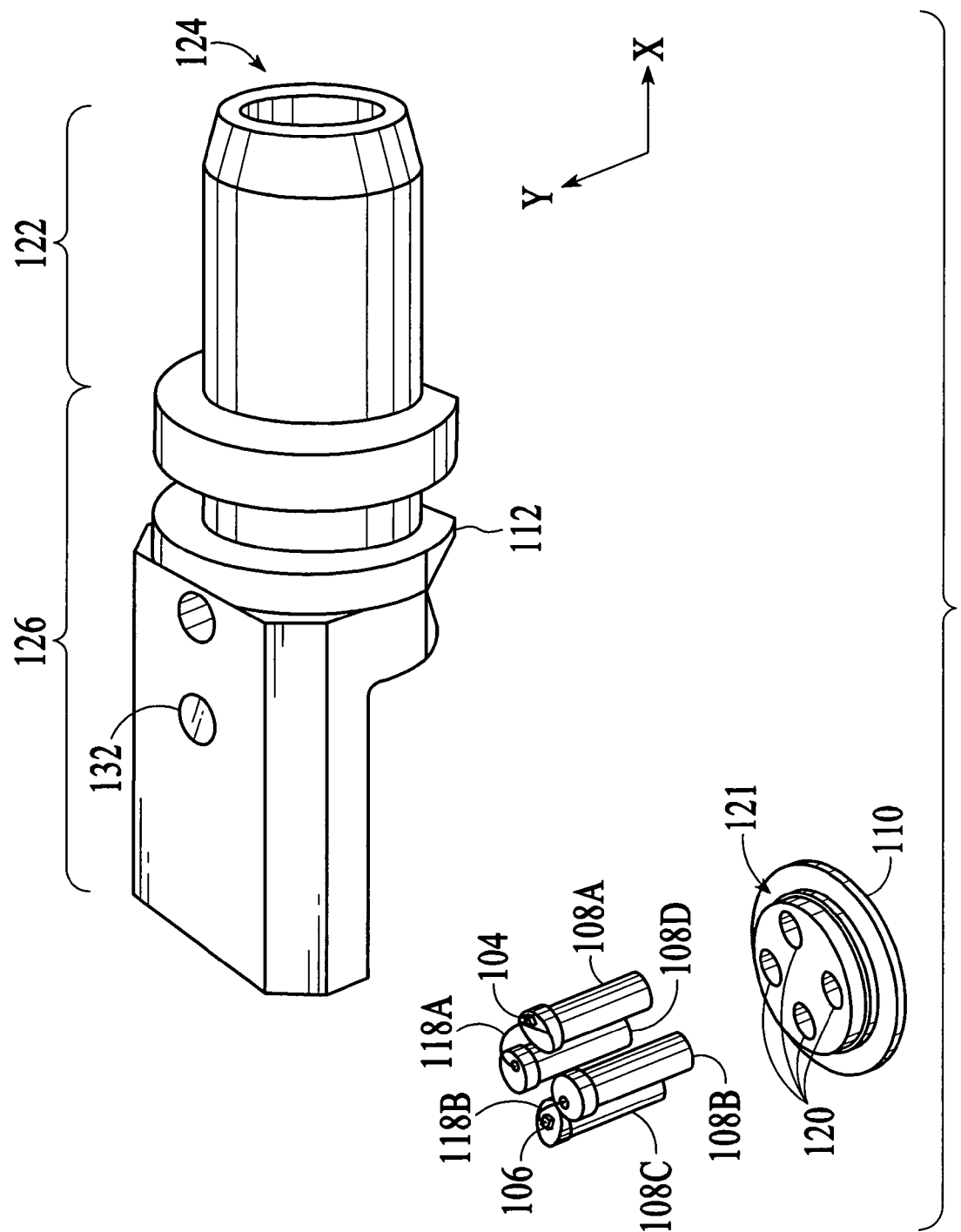
FIG. 3 is a partially exploded view of the optical transmitter module of FIG. 1.

With reference to FIGS. 1, 2 and 3, an optical transmitter module 100 in accordance with an embodiment of the invention is described. FIG. 1 is a side view of the optical transmitter module 100 connected to a printed circuit board (PCB)

102. FIG. 2 is a top view of the optical transmitter module 100. FIG. 3 is a partially exploded view of the optical transmitter module 100. As described in more detail below, the optical transmitter module 100 uses a state of the art, high-precision, mass-production injection molded polymer lens rather than an expensive ball lens or glass a-sphere. The use of a polymer lens allows various components of the optical transmitter module 100 to be made of polymer material, which significantly reduces the total manufacturing cost of the module by reducing the number of process steps necessary to build the module. Furthermore, the design of the optical transmitter module 100 does not require header lead pins to be bent in complex ways to attach the module to the PCB 102 and to connect the module to an optical transceiver (not shown).

As illustrated in FIGS. 1, 2 and 3, the optical transmitter module 100 includes a light source 104, a photodetector 106, header lead pins 108A, 108B, 108C and 108D, a header 110 and a housing structure 112 with an integrated lens 114. The light source 104 is designed to generate light along a direction substantially parallel to the X-axis toward the integrated lens 114 of the housing structure 112, as shown in FIG. 1. The light emitted from the light source 104 is transmitted through the integrated lens 114 of the housing structure 112 to an optical fiber 116 connected to the optical transmitter module 100. In this embodiment, the light source 104 is an edge-emitting laser die. However, the light source 104 may be any light generating device. The photodetector 106 is designed to receive back-facet emission from the light source 104 to monitor the operation of the light source. In this embodiment, the photodetector 106 is a photodiode. However, the photodetector 106 may be any light detecting device. As shown in FIG. 3, the light source 104 is mounted on the header lead pin 108A, and the photodetector 106 is mounted on the header lead pin 108C.

In this embodiment, each of the header lead pins 108A, 108B, 108C and 108D includes a disk-shaped head and an elongate cylindrical body. However, in other embodiments, the header lead pins 108A, 108B, 108C and 108D may have different configurations. The header lead pins 108A, 108B, 108C and 108D are micromachined structures, which are used to electrically and structurally connect the optical transmitter module 100 to the PCB 102. The head of the header lead pin 108C is angled such that the entire upper surface of the head is angled with respect to a plane substantially perpendicular to the central axis of the header lead pin 108C, which is parallel to the Y-axis, as shown in FIG. 1. The head of the header lead pin 108A is partially angled such that a portion of the upper surface of the head is angled and the rest of the upper surface is horizontally planar, i.e., substantially parallel to a plane perpendicular to the central axis of the header lead pin 108A. The photodetector 106 is mounted on the angled surface of the header lead pin 108C, while the light source 104 is mounted on the horizontally planar surface of the header lead pin 108A. The angled portion of the header lead pin 108A provides clearance between the light source 104 and the photodetector 106 so that the photodetector can efficiently receive back-facet emission from the light source to monitor the operation of the light source.

The header lead pins 108A, 108B, 108C and 108D are made of electrically conductive material, and are thus conductive pins. As an example, the header lead pins 108A, 108B, 108C and 108D may be made of Beryllium Copper (BeCu) coated with gold (Au). Since the light source 104 is mounted on the header lead pin 108A, the light source is electrically connected to that header lead pin. The light source 104 is also electrically connected to the header lead pin 108D via a bond wire 118A. The header lead pins 108A and 108D are used as electrical connections to the light source 104 to drive the light source. Similarly, the photodetector 106 is electrically connected to the header lead pin 108C on which the photodetector is mounted, and to the header lead pin 108B via a bond wire 118B. Thus, the header lead pins 108B and 108C are used to receive electrical charges generated by the photodetector 106 in response to received light, i.e., the back-facet emission of the light source 104.

The header lead pins 108A, 108B, 108C and 108D are attached to the housing structure 112 via the header 110. As shown in FIG. 1, the header lead pins 108A, 108B, 108C and 108D are attached to the header 110 such that the header lead pins extend from the housing structure 112 along a direction substantially parallel to the Y-axis. Since the light source 104 is mounted on the horizontally planar surface of the header lead pin 108A, the light emitted from the light source is transmitted in a direction substantially parallel to the X-axis, and thus, is perpendicular to the direction in which the header lead pins 108A, 108B, 108C and 108D are orientated.

Figure 6:
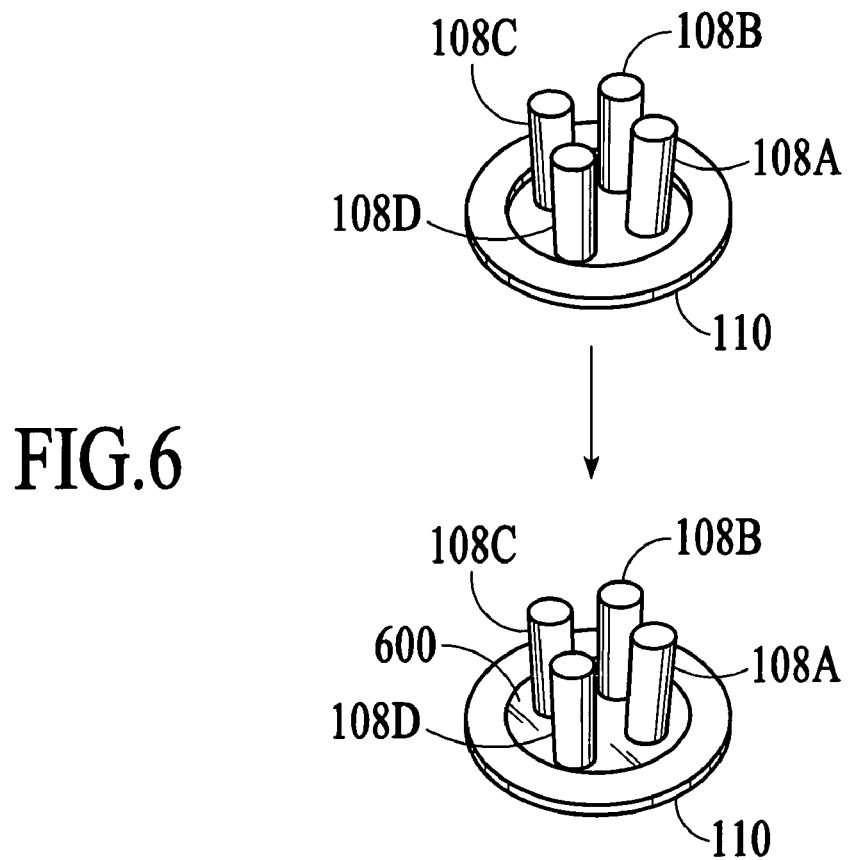
FIG. 6 illustrates the process of securing the header pin leads to the header to make the header sub-assembly of the optical transmitter module of FIG. 1 in accordance with an embodiment of the invention.

The header lead pins 108A, 108B, 108C and 108D are held together by the header 110 in openings 120 of the header, which are shown in FIG. 3, into which the header lead pins are positioned. The header lead pins 108A, 108B, 108C and 108D may be secured to the header 110 by a filler epoxy 600, which can be applied to the bottom surface of the header where the header lead pins extend from the header, as illustrated in FIG. 6. The header 110 is made of an electrically insulating material that isolates the electrically conductive header pins from each other's signals. As an example, the header 110 may be made of molded polymer, or a composition of a polymer including thermally conductive, but electrically insulating particles, fibers or any other type of inclusions. In this embodiment, the header 110 is relatively flat and has a circular protrusion 121 on which the heads of the header lead pins 108A, 108B, 108C and 108D are positioned, as shown in FIG. 1. The circular protrusion 121 of the header 110 fits into the housing structure 112, as described below, and is used for alignment purposes.

Figure 4:
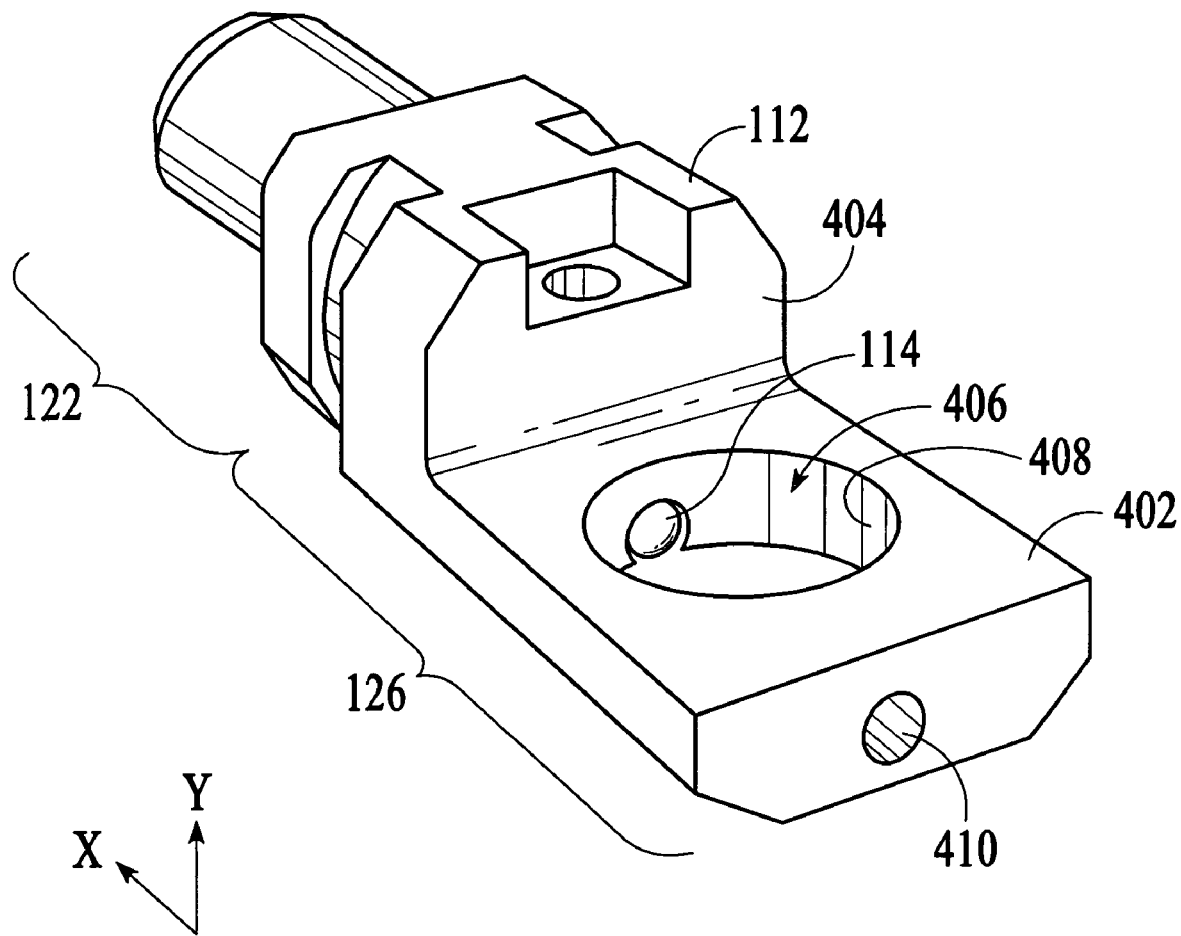
FIG. 4 is a bottom perspective view of a housing structure of the optical transmitter module of FIG. 1.

The housing structure 112 of the optical transmitter module 100 includes a fiber ferrule 122 with an output opening 124 to receive the optical fiber 116, which may be a mono-mode or multi-mode optical fiber. The fiber ferrule 122 extends from a main body portion 126 of the housing structure 112 such that the central axis CA of the output opening is orientated along a direction substantially parallel to the X-axis, as shown in FIGS. 1 and 2. As illustrated in FIG. 4, which is a bottom perspective view of the housing structure 112, the main body portion 126 has a bottom surface 402 and a side surface 404, which are substantially perpendicular to each other. The bottom surface 402 is substantially parallel to the X-axis, while the side surface 404 is substantially parallel to the Y-axis. In the illustrated embodiment, the housing structure 112 conforms to a GigaBit Interface Connector (GBIC) form factor. However, in other embodiments, the housing structure 112 may conform to other form factors, commonly known and used in the optical transmitter modules. Furthermore, the housing structure 112 is illustrated in FIGS. 1-4 as being a single structure. However, in other embodiments, the housing structure 112 may be multiple structure components that are assembled together.

As best shown in FIG. 4, the housing structure 112 includes a circular recessed region 406 located at the bottom surface 402. The circular recessed region 406 is configured to receive the circular protrusion 121 of the header 110 so that the header with the header lead pins 108A, 108B, 108C and 108D can be fitted with the housing structure 112 to form the optical transmitter module 100. When fitted, the light source 104 and the photodetector 106 mounted on the heads of the header lead pins 108A and 108C are positioned within the circular recessed region 406 of the housing structure 112, as shown in FIG. 1. In other embodiments, the recessed region 406 of the housing structure and the protrusion 121 of the header 110 may not be circular. As an example, the recessed region 406 and the protrusion 121 may be rectangular, and even polygonal.

The housing structure 112 includes optical features to efficiently transmit the light emitted from the light source 104 to the output opening 124, which is used to connect the optical fiber 116 with the optical transmitter module 100. One of these optical features is the integrated lens 114 formed on the sidewall 408 of the circular recessed region 406 at a location near the fiber ferrule 122. The integrated lens 114 is used collimate the light emitted from the light source 104 to optimize the optical coupling of the light source to the optical fiber 116. In an embodiment, the integrated lens 114 is formed using under-cut molding on the surface of the sidewall 408 of the circular recessed region 406. The lens surface can be molded into any shape, such as spherical, a-spherical, toroidal or diffractive. The housing structure 112 includes an access opening 410 in the sidewall 408 of the circular recessed region 406 at a location opposite of the location of the integrated lens, allowing access to the sidewall 408 to form the integrated lens 114 using under-cut molding.

Another optical feature of the housing structure 112 is a focusing lens 128 formed in the output opening 124 of the fiber ferrule 122 to focus the light from the light source 104 into the optical fiber 116 to efficiently transmit the light into the optical fiber. The focusing lens 128 is created by a cylindrical void formed in the housing structure 112, which has a concaved surface that focuses the light from the light source 104.

In this embodiment, the optical transmitter module 100 is designed such that the output opening 124 of the housing structure 112 is at the same height as the PCB 102 on which the module is mounted, as shown in FIG. 1. Thus, the optical fiber 116 inserted into the output opening 124 is also at the same height as the PCB 102. Since the light source 104 is positioned above the PCB 102 when the optical transmitter module 100 is mounted on the PCB, the light emitted from the light source needs to be lowered to be transmitted into the optical fiber 116. In this embodiment, the optical transmitter module 100 includes reflector 130A and 130B positioned between the integrated lens 114 and the focusing lens 128 to direct the light from the light source 104 to the optical fiber 116. The reflector 130A is created by a cylindrical void formed at the top of the housing structure 112 with an angled planar surface, which reflects the light from the integrated lens 114 toward the reflector 130B. Similarly, the reflector 130B is created by a cylindrical void formed at the bottom of the housing structure 112 with an angled planar surface to reflect the light from the reflector 130A toward the focusing lens 128. As an example, the angled planar surface of the reflector 130A may be orientated to perpendicularly redirect the light from the integrated lens 130, while the angled planar surface of the reflector 130B is designed to perpendicularly redirect the light from the reflector 130B toward the focusing lens 128, as illustrated in FIG. 1. The positions of the angled surfaces of the reflectors 130A and 130B within the housing structure 112 will depend on the relative height of the output opening 124 with respect to the light source 104. In an embodiment where the light source 104 and the output opening 124 are at the same height, the reflector 130A and 130B are not needed.

The housing structure 112 further includes a viewing window 132 located on the top surface of the housing structure directly above the integrated lens 114. The viewing window 132 allows active alignment of the light source 104 with the integrated lens 114 by visual observation. The light source 104 and the integrated lens 114 may also be aligned by activating the light source and measuring the amount of light transmitted out of the optical fiber 116.

The process for making the optical transmitter module 100 in accordance with an embodiment of the invention is now described with references to FIGS. 5-8, as well as FIG. 1. Prior to assembly, the components of the optical transmitter module 100 are fabricated. The header lead pins 108A and 108C are micromachined to form the angled surfaces on the heads of the header lead pins. The header 110 and the housing structure 112 are molded into desired shapes using one or more plastic materials, e.g., polymer materials. The integrated lens 114 of the housing structure 112 is then formed by under-cut molding using the access opening 410 in the housing structure.

Figure 5:
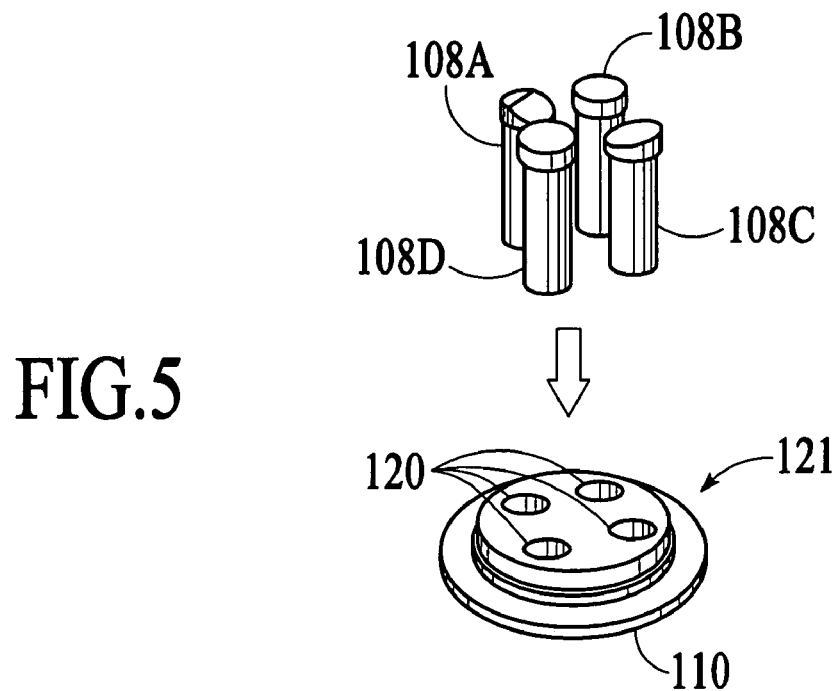
FIG. 5 illustrates the process of fitting header pin leads into a header to make a header sub-assembly of the optical transmitter module of FIG. 1 in accordance with an embodiment of the invention.
Figure 7:
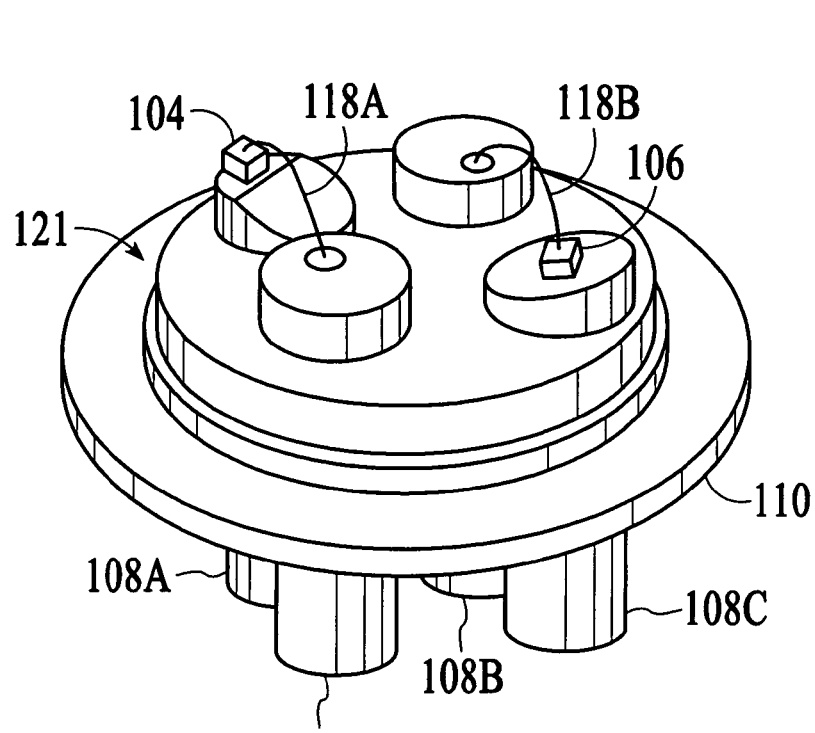
FIG. 7 shows the header sub-assembly of the optical transmitter module of FIG. 1.
Figure 8:
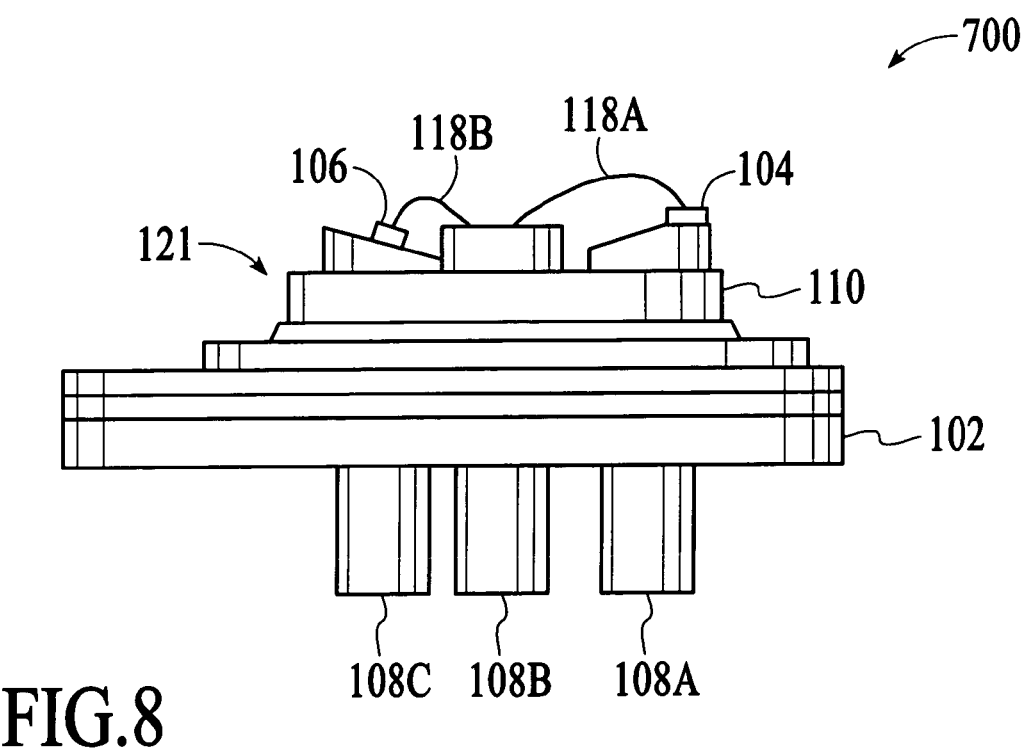
FIG. 8 shows the header sub-assembly of FIG. 7 connected to a printed circuit board (PCB).

The first step in the assembly process involves fitting the header lead pins 108A, 108B, 108C and 108D into the holes 120 of the header 110, as shown in FIG. 5. Next, the header lead pins 108A, 108B, 108C and 108D are secured to the header 110 using a filler epoxy 600 at the bottom the header, as illustrated in FIG. 6. The light source 104 and the photodetector 106 are then set on the heads of the header lead pins 108A and 108C and wire-bonded to the heads of the header lead pins 108D and 108B, respectively, using the bond wires 118A and 118B to form a header sub-assembly 700, as shown in FIG. 7. The header sub-assembly 700 is then physically and electrically connected to the PCB 102 using the header lead pins 108A, 108B, 108C and 108D, as shown in FIG. 8.

Next, the housing structure 112 is attached to the PCB 102 and the header sub-assembly 700, as shown in FIG. 1. This involves placing the housing structure 112 over the exposed header sub-assembly 700 on the PCB 102. Specifically, the circular protrusion 121 of the header 110 is fitted into the circular recessed region 408 of the housing structure 112. The light source 104 on the header sub-assembly 700 can be visually aligned with the integrated lens 114 of the housing structure 112 using the viewing window 132 of the housing structure. Curable adhesives can be used to secure the housing structure 112 to the PCB 102 at strategic locations. As an example, curable adhesives 134 can be used between the bottom surface 402 of the housing structure 112 and the upper surface of the PCB 102, and between the bottom surface of the PCB and the side surface 404 of the housing structure, as shown in FIG. 1.

Figure 9:
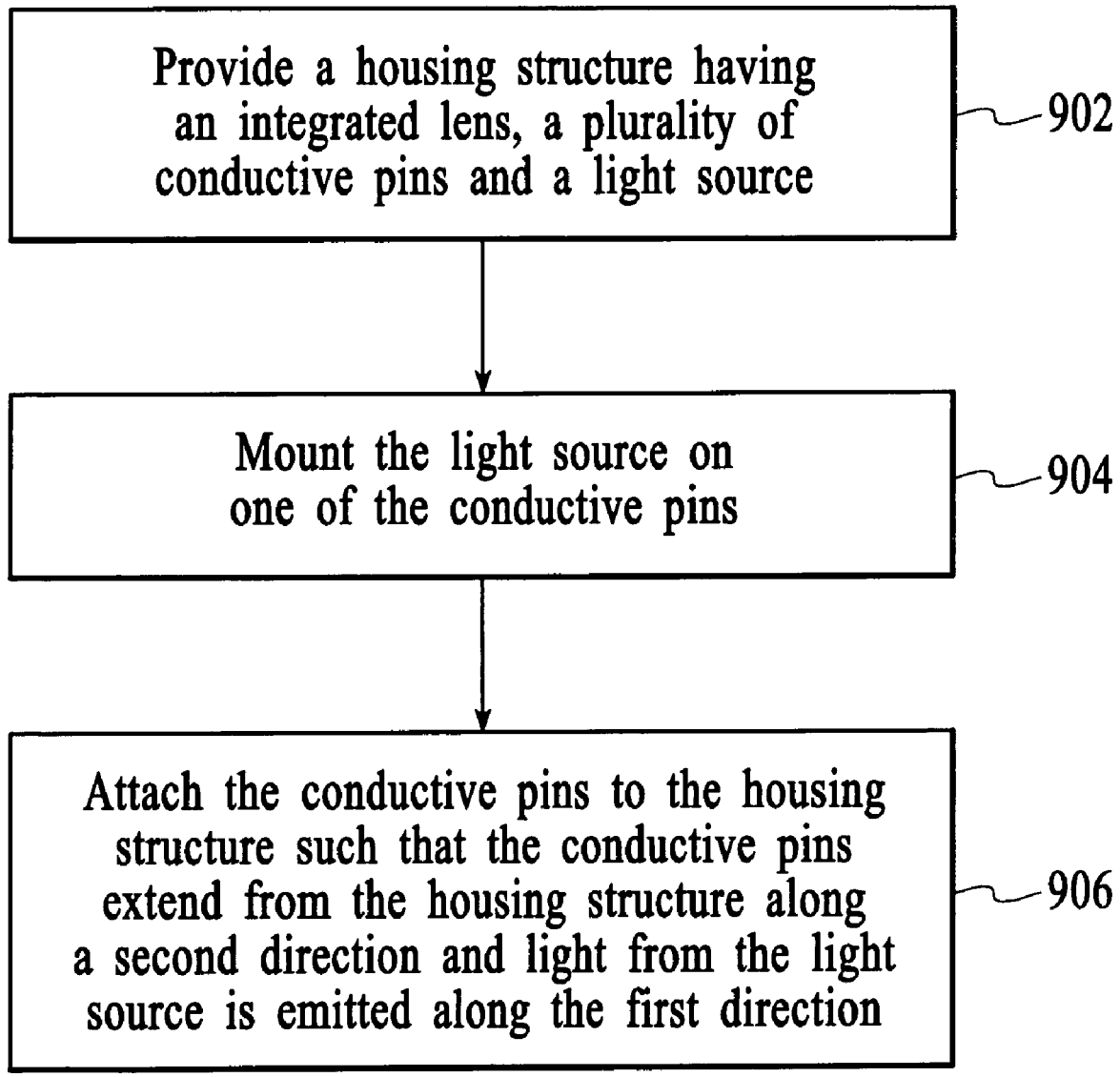
FIG. 9 is a process flow diagram of a method for making an optical transmitter module in accordance with an embodiment of the invention.

A method for making an optical transmitter module in accordance with an embodiment of the invention is described with reference to a process flow diagram of FIG. 9. At block 902, a housing structure having an integrated lens, a plurality of conductive pins and a light source are provided. The housing structure includes an output opening, which has a central axis along a first direction, to receive an optical fiber. In an embodiment, the light source is an edge-emitting laser die. Next, at block 904, the light source is mounted on one of the conductive pins. Next, at block 906, the conductive pins are attached to the housing structure such that the conductive pins extend from the housing structure along a second direction and light from the light source is emitted along the first direction. The second direction is substantially perpendicular to the first direction.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical transmitter module comprising:
   a housing structure having an integrated lens, said housing structure including an output opening to receive an optical fiber, said output opening having a central axis along a first direction;
   a plurality of conductive pins attached to said housing structure such that said conductive pins extend from said housing structure along a second direction, said second direction being substantially perpendicular to said first direction; and
   a light source mounted on an end surface of a specific conductive pin of said conductive pins such that light from said light source is emitted along said first direction toward said integrated lens of said housing structure to transmit said light into said optical fiber, said end surface of said specific conductive pin being located at one of the ends of said specific conductive pin,
   wherein said housing structure includes a recessed region having a sidewall, said integrated lens being formed on said sidewall.

2. The module of claim 1 wherein said integrated lens has a surface that is spherical, a-spherical, toroidal or diffractive.

3. The module of claim 1 wherein said housing structure includes an access opening in said sidewall of said recessed region, said access opening providing access to form said integrated lens on said sidewall using undercut molding.

4. The module of claim 3 further comprising a header configured to secure said conductive pins, said header having a protrusion that conforms to said recessed region of said housing structure such that said protrusion can be fitted into said recessed region.

5. An optical transmitter module comprising:
   a housing structure having an integrated lens, said housing structure including an output opening to receive an optical fiber, said output opening having a central axis along a first direction;
   a header attached to said housing structure, said header having a number of holes;
   a plurality of conductive pins fitted into said holes of said header such that said conductive pins extend from said header along a second direction, said second direction being substantially perpendicular to said first direction; and
   an edge-emitting laser die mounted on an end surface of a specific conductive pin of said conductive pins such that light from said edge-emitting laser die is emitted along said first direction toward said integrated lens of said housing structure to transmit said light into said optical fiber, said end surface of said specific conductive pin being located at one of the ends of said specific conductive pin,
   wherein said housing structure includes a recessed region having a sidewall, said integrated lens being formed on said sidewall.

6. The module of claim 5 wherein said housing structure includes an access opening in said sidewall of said recessed region, said access opening providing access to form said integrated lens on said sidewall using undercut molding.

7. A method for making an optical transmitter module, said method comprising:
   providing a housing structure having an integrated lens, a plurality of conductive pins and a light source, said housing structure including an output opening having a central axis along a first direction;
   mounting said light source on an end surface of a specific conductive pin of said conductive pins, said end surface of said specific conductive pin being located at one of the ends of said specific conductive pin;
   attaching said conductive pins to said housing structure such that said conductive pins extend from said housing structure along a second direction and light from the light source is emitted along said first direction toward said integrated lens to transmit the light into the optical fiber, said second direction being substantially perpendicular to said first direction; and
   forming said integrated lens of said housing structure using under-cut molding at a particular location on a sidewall of a recessed region of said housing structure.

8. The method of claim 7 wherein said forming of said integrated lens includes accessing said particular location on said sidewall through an access opening in said sidewall.

* * * * *